United States Patent [19]

Fujii

[11] Patent Number: 5,199,667

[45] Date of Patent: Apr. 6, 1993

[54] BALANCING DEVICE FOR AIR FLOATERS

[75] Inventor: Yoshiro Fujii, Chiba, Japan

[73] Assignees: Adonis Inc.; Dentsu Prox Inc., both of Tokyo, Japan

[21] Appl. No.: 692,370

[22] Filed: Apr. 26, 1991

[30] Foreign Application Priority Data

Apr. 27, 1990 [JP] Japan ............................. 2-44659[U]
Oct. 8, 1990 [JP] Japan ................................ 2-268372

[51] Int. Cl.$^5$ .............................................. B64B 1/40
[52] U.S. Cl. ...................................... 244/93; 244/96; 244/31
[58] Field of Search ................... 244/30, 93, 94, 96, 244/97, 98, 99, 31

[56] References Cited

U.S. PATENT DOCUMENTS

| 4,014,280 | 3/1977 | Laxo | 244/93 |
| 5,042,748 | 8/1991 | Conn | 244/96 |

FOREIGN PATENT DOCUMENTS

| 0033298 | 3/1977 | Japan | 244/93 |
| 8202840 | 9/1982 | World Int. Prop. O. | 244/93 |

Primary Examiner—Margaret A. Focarino
Assistant Examiner—Carla Mattix
Attorney, Agent, or Firm—Flynn, Thiel, Boutell & Tanis

[57] ABSTRACT

An air floater comprises a balloon body which seals a gas therein and balancing means detachably attached to the balloon body. The balloon body comprises a film composed of a central layer made of ethylene-vinyl alcohol copolymer-resin, an aluminum evaporated layer provided outside the central layer, and a heated adhesive layer provided inside the central layer. The balancing means comprises a plurality of magnetic cards which are attracted by an attraction portion composed of a magnetic body attached to the balloon body. The plurality of magnetic cards includes one card having a reference weight matched with the buoyant force of the balloon body, first weight balancing cards having weight heavier by stages than the reference weight, and second weight balancing cards having weight lighter by stages than the reference weight. The balancing means may comprise sublimate sealed in a bag body. The balancing means also may comprise a balancer cover composed of an adhesive surface portion having a rear surface to be adhered to the balloon body, a cover portion, a folding portion for integrally connecting both the adhesive surface portion and the cover portion, a balancer composed of one sheet and capable of separating into a reference balancer and a regulating balancer, and a both-sided adhesive sheet for rendering the reference balancer to adhere to the surface of the adhesive surface portion. The air floater is adapted for use as a miniature airship.

12 Claims, 7 Drawing Sheets

BALANCING DEVICE FOR AIR FLOATERS

BACKGROUND OF THE INVENTION

1. Field of the Invention

The present invention relates to an air floater capable of floating in the air by balancing a lifting power, i.e. lift influencing a balloon body (hereinafter referred to as lift of the balloon body) with gravity influencing a balancing means (hereinafter referred to as gravity of balancing means) attached to the balloon body.

2. Prior Art

A conventional air floater floats in the air by balancing the lift of the balloon body with the gravity of the balancing means. There have been variously proposed air floaters capable of floating in the air by regulating the weight of the balancing means attached to the air floaters. As a first example, there has been proposed a balloon body having a hanging string attached to the balloon body and a balancing weight attached to the balloon body as disclosed in Japanese Utility Model Laid-Open Publication No. 59-69796. As a second example, there has also been proposed a balloon body having a seal detachably attached thereto which seal serves as a balancing weight as disclosed in Japanese Patent Laid-Open Publication No. 61-106299. There has been proposed, as a third example, a balloon body made of ethylene vinyl alcohol copolymer-resin as disclosed in Japanese Utility Model Laid-Open Publication No. 63-145629.

However, there have been the following problems in the conventional air floaters.

In the first example, the hang string is liable to contact an obstacle which impedes the floating of the balloon body. In the second example, since the balloon body is balanced by attaching the seal thereto or detaching the seal therefrom, it is laborious to effect attaching and detaching operations, which results in inefficient working performance.

Various experiments made by the inventor revealed that a small balloon having a capacity of 15 liters can float or raise or lower by slightly regulating the balancing means having a weight of 0.25 g. Accordingly, the balloon can be regulated by the weight of 0.25 g. A small balloon having a capacity of 18 liters can be regulated by the weight of 0.125 g. It was very difficult to attach such small balancing means to the balloon body or detach such small balancing means from the balloon body.

In the third example, there was a likelihood that the gas barrier characteristic is deteriorated since the balloon body is damaged when the seal is detached from the balloon body.

SUMMARY OF THE INVENTION

It is therefore an object of the present invention to provide an air floater solving the problems of the conventional air floater and having a gas barrier characteristic of high performance and provided with balancing means which is regulated with ease and does not impede the balloon body from floating.

It is a further object of the present invention to provide an air floater provided with balancing means which is set as a kit singly or in combination with a balloon body.

To achieve the above object, the air floater of a first aspect of the present invention comprises a balloon body which seals a gas therein, the gas having a specific gravity less than air, and balancing means detachably attached to the balloon body and having a weight conforming to the lift of the balloon body, characterized in that the balloon body comprises a film composed of a central layer made of ethylene-vinyl alcohol copolymer-resin, and aluminum evaporated layer provided outside the central layer, and a heated adhesive layer provided inside the central layer; and the balancing means comprises a card holder provided at the outer periphery of the balloon body, and a plurality of cards selectively inserted into the card holder, the plurality of cards being composed of a reference weight balancing card matched with the lift of the balloon body, first weight balancing cards having weight heavier by stages than the reference weight, and second weight balancing cards having weight lighter by stages than the reference weight.

The air floater of a second aspect of the present invention includes balancing means comprising a plurality of magnetic cards which are attracted by an attraction portion composed of a magnetic body attached to the balloon body, the plurality of magnetic cards being composed of one card having a reference weight matched with the buoyant force of the balloon body, first weight balancing cards having weight heavier by stages than the reference weight, and second weight balancing cards having weight lighter by stages than the reference weight.

The air floater of a third aspect of the present invention includes balancing means comprising a sublimate sealed in a bag body attached to the balloon body, the sublimate being regulated to sublime gradually corresponding to the amount of decrease of the lift of the balloon body.

The air floater of a fourth aspect of the present invention includes balancing means comprising a balancer cover composed of an adhesive surface portion having a rear surface to be adhered to the balloon body, a cover portion, a folding portion for integrally connecting both the adhesive surface portion and the cover portion, a balancer composed of one sheet and capable of separating into a reference balancer and a regulating balancer, and a both-sided adhesive sheet for rendering the reference balancer to adhere to the surface of the adhesive surface portion.

The air floater of a fifth aspect of the present invention comprises an airship body composed of a film and amorphous sheets functioning as solar cells attached to the film, and balancing means composed of a cockpit having therein a motor which is driven upon reception of electric energy from the solar cells which receive light from the sun or indoor and outdoor illuminators and covert the received light into electric energy, a propeller operated by the motor and a rudder for steering the airship body.

The above and other objects, features and advantages of the present invention will become more apparent from the following description taken in conjunction with the accompanying drawings.

BRIEF DESCRIPTION OF THE DRAWINGS

FIGS. 7(A) to 7(C) show a cover of the balancing means of the air floater of FIG. 6 wherein FIG. 7(A) is a plan view; FIG. 7(B) is a cross-sectional view; and FIG. 7(C) is a view showing the cover folded;

PREFERRED EMBODIMENT OF THE INVENTION

Figure 1:
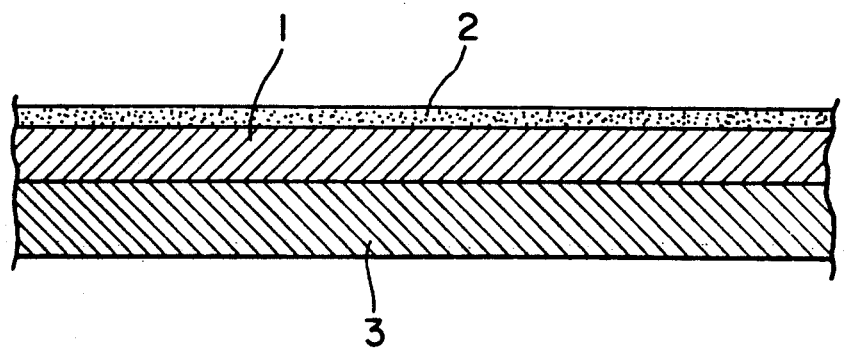
FIG. 1 is a cross-sectional view showing a film of a balloon body according to a first embodiment of the present invention.
Figure 2:
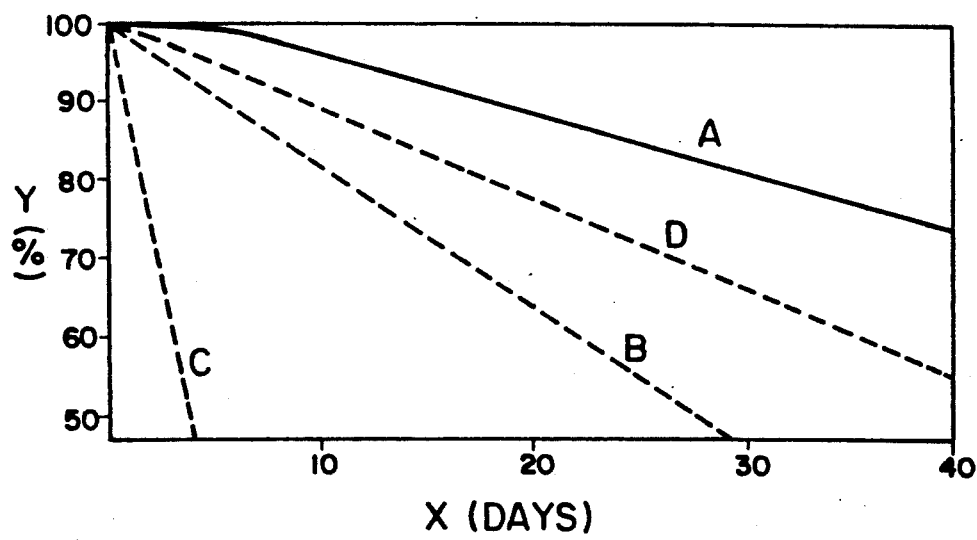
FIG. 2 is a graph showing the relationship between the remaining amount of gas in the balloon body and lapsed time when gas is leaked.
Figure 3:
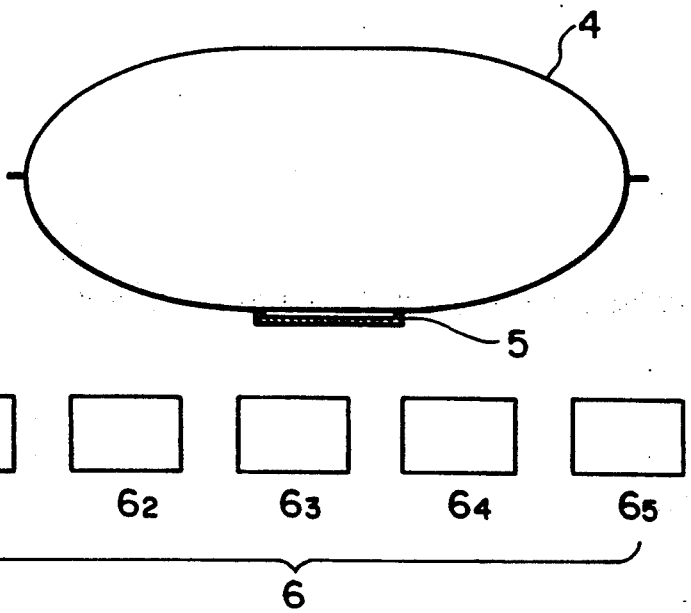
FIG. 3 is a cross-sectional view of an air floater according to a first embodiment of the present invention.

First Embodiment (FIGS. 1 to 3)

It is important for manufacturing an air floater to select a film for the balloon body having sufficient strength and gas barrier or remanent characteristics. Particularly, the balloon body needs to float in the air while gas sealed in the balloon body is prevented from leaking therefrom for thirty days for performing the sufficient function and marketability.

Furthermore, balancing adjustment by a balancing means has to be made with simplicity and assurance. The applicant's experiment revealed that a balloon body having a small capacity of 15 liters is raised or lowered with a small weight, i.e. 0.25 g. Accordingly, the air floater should have balancing means which can be changed in weight by at least 0.25 g.

In view of the gas barrier characteristics, the balloon body is, as illustrated in FIG. 1, composed of a film, i.e. a central layer 1 made of ethylene-vinyl alcohol copolymer-resin, an aluminum evaporated layer 2 provided outside the layer 1, and a heated adhesive layer 3 composed of heat sealing material of the polyethylene group positioned inside the layer 1.

For manufacturing the balloon body, the layers for forming the film are joined with each other in a variety of shapes. For joining the layers, it is simplest to fuse the layers and adhere them to each other. However, the layers made of ethylene-vinyl alcohol copolymer-resin and evaporated aluminum do not have characteristics of fusing and adhesion so that the addition of the resin layer of polyethylene gives the material the characteristics of fusing and adhesion.

FIG. 2 is a graph showing the gas barrier characteristics between a three-layered film according to the present invention and other films in which the ordinate shows the remanent volume of sealed gas (helium gas) (Y %) while the abscissa shows lapsing time (X days).

The three-layered film according to the present invention has gas barrier characteristics or remanent characteristics as shown in FIG. 2 wherein sealed gas is kept inside the balloon body over thirty days and 75% of sealed gas still remains even if forty days are lapsed as denoted at A in FIG. 2. Meanwhile, the remanent characteristics of the aluminum evaporated polypropylene film shows that sealed gas is reduced to half after the lapse of four days as denoted at C in FIG. 2, and the remanent characteristics of the aluminum evaporated nylon film shows that sealed gas is reduced to half after the lapse of twenty-nine days as denoted at B in FIG. 2, while the remanent characteristics of ethylene-vinyl alcohol copolymer-resin alone shows that 57% of sealed gas remains after the lapse of forty days as denoted at D in FIG. 2.

A crushing test of the balloon body composed of three-layered film and having a diameter of forty centimeters according to the present invention made by the same applicant shows that the balloon body was crushed by the weight of 120 kg while the balloon body composed of aluminum evaporated polypropylene film is crushed by the weight of 35 kg. Accordingly, it is evident that the crushing strength of the three-layered film of the present invention is superior to that of the aluminum evaporated polypropylene film.

The balancing adjustment mechanism of the balloon body will be described first with reference to FIG. 3.

The balloon body 4 seals therein helium gas and the like having specific gravity lighter than ordinary air. The balloon body 4 has a card holder 5 attached to the surface of the balloon body 4 and the card holder 5 is rectangular and pocket shaped by attaching three sides of the rectangular card holder 5 to the surface of the balloon body 4. The structure of the card holder 5 is not limited to such a rectangular shape. The shape of the cards is not limited to rectangular. A plurality of cards $6_1$, $6_2$, $6_3$, $6_4$ and $6_5$ are selectively inserted into the card holder 5. The card $6_3$ is a reference weight balancing card which has a weight balancing with lift influencing the balloon body 5. The cards $6_2$ and $6_1$ are lighter than the card $6_3$ and the cards $6_4$ and $6_5$ are heavier than the card $6_3$. According to the present embodiment, the card $6_3$ weighs 3.5 g while the card $6_2$ weighs 3.25 g and the card $6_1$ weighs 3 g. The card $6_4$ weighs 3.75 g and the card $6_5$ weighs 4 g. It is of course possible to employ more cards, if need be.

The card 6 can be inserted into the card holder 5 in the following manner.

The reference weight card $6_3$ is first inserted into the card holder 5. If the weight of the card $6_3$ seems light, the card $6_3$ is replaced by the card $6_4$. If the weight of the card $6_3$ seems heavy, the card $6_3$ is replaced by the card $6_2$ which is lighter than the card $6_3$. If the card $6_4$ or the card $6_2$ does not float the balloon body 4, the card $6_4$ or the card $6_2$ is replaced by the card $6_5$ or the card $6_1$. That is, the heavier or lighter card is selectively inserted into the card holder 5. The number of cards depends on the number of stages at which stages the weight of the balancing means is gradually changed to match the lift of the balloon body 4. Hence, the number of cards is not limited to two stages of cards lighter or heavier than the reference card but may be selected appropriately such as three stages or more depending on the capacity of the balloon body. The weight increment in three stages is not limited to 0.25 g as set forth above but may be other weights depending on the capacity of the balloon body.

Papers, synthetic resins and metals and the like are employed as materials of the cards. Since the papers have humidity absorption characteristics, the synthetic resins or metals are preferable. However, if the papers have less humidity absorption characteristics, they may be practically used.

Figure 4:
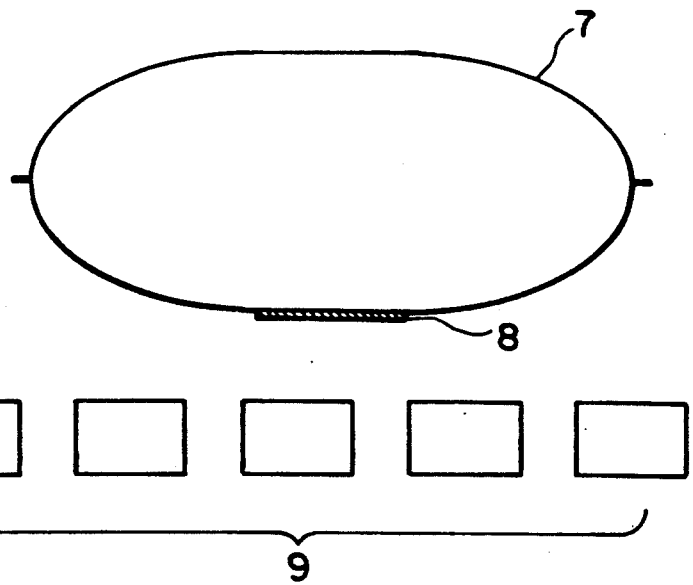
FIG. 4 is a cross-sectional view of an air floater according to a second embodiment of the present invention.

Second Embodiment (FIG. 4)

An air floater according to a second embodiment will be described with reference to FIG. 4.

The second embodiment employs magnetic cards instead of the card holder and the cards of the first embodiment.

There is formed an attraction portion 8 attached to a surface of the balloon body 7 and composed of a magnetic piece such as a piece of iron. There are used a plurality of cards 9 composed of pieces of a magnet which are to be attracted by the attraction portion 8. The cards 9 include a reference weight card and a plurality of cards respectively having weights which are varied in multiple stages like those employed in the first embodiment. The piece of the magnet can be attached to the balloon body and the cards to be attracted by the magnet may comprise magnetic pieces.

Figure 5:
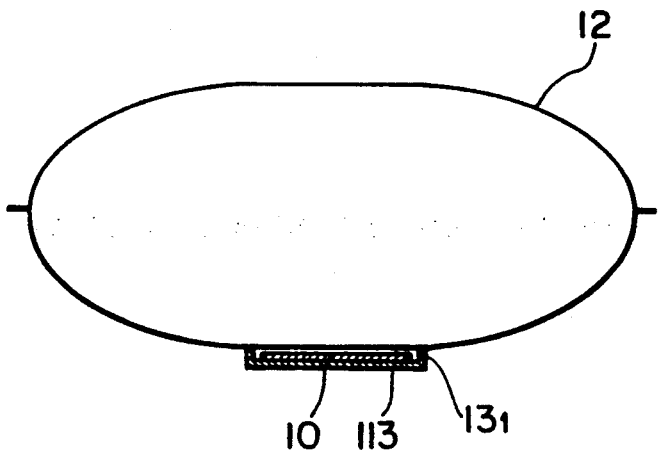
FIG. 5 is a cross-sectional view of an air floater according to a third embodiment of the present invention.

Third Embodiment (FIG. 5)

An air floater according to a third embodiment will be described with reference to FIG. 5.

A sublimate such as camphor is employed as a balancing weight instead of the cards in the first and second embodiments. The camphor is sublimated in response to the amount of sealed gas leaked from the balloon body. That is, when the gas is leaked from the balloon body the balloon body is liable to lower but the sublimate contained in a bag attached to the balloon body is sublimated so that the air floater floats in the air. The balancing means comprises a bag 113 attached to a balloon body 12 and camphor 10 contained in the bag 113. The bag 113 has a plurality of minute holes $13_1$ at the periphery thereof through which volatile matter of camphor passes. The balancing weight can be regulated by appropriately selecting the number of minute holes $13_1$ and the diameters of the minute holes in accordance with the amount of sealed gas leaked from the balloon body 12. The sublimate is not limited to the camphor but can include naphthalene and can further include water or alcohol. If water or alcohol is contained in the bag 113, the bag does not have minute holes at the surface thereof but a structure wherein water and alcohol can gradually evaporate. As mentioned above, the sublimate employed in the third embodiment can include material capable of sublimating or evaporating.

Helium is most preferable as the gas to be sealed in the balloon body but hydrogen and other gas lighter than the air can be employed as the gas.

The air floaters according to the first and second embodiments of the present invention have the following advantages.

Inasmuch as the balancing means adopts the card type weight balancing system, the weight can be regulated with ease and assurance.

Since the card is directly attached to the surface of the balloon body, the card does not impede the floating of the air floater and does not give any malaise to the people. The magnetic cards as employed in the second embodiment can be attached to or detached from the magnet attached to the balloon body with ease.

The air floater according to the third embodiment of the present invention has the following advantages. The weight of the air floater can be automatically regulated, and the sublimate need not be changed for a long period of time, thereby enhancing the marketability of the air floater.

The film composing the balloon body according to the first and third embodiments has good gas barrier characteristics, and the air floater can float in the air for a long period of time.

Fourth Embodiment (FIGS. 6 to 11)

An air floater according to a fourth embodiment of the present invention will be described with reference to FIGS. 6 to 11.

The air floater comprises a balloon body F which seals a gas therein, the gas having a specific gravity less than air same as in the first to third embodiments. The air floater further comprises balancing means detachably attached to the balloon body F and having a weight to be regulated to conform to the lift of the balloon body F. The balancing means comprises a balancer cover 11, a sheet shaped balancer 12 and a both-sided adhesive agent 13.

Figure 6:
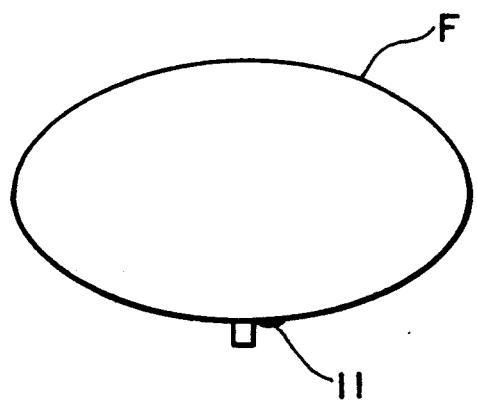
FIG. 6 is a cross-sectional view of an air floater according to a fourth embodiment of the present invention.

The balancing means are attached to the balloon body F as illustrated in FIG. 6 wherein the gravity of the balancer 12 held by the balancer cover 11 is balanced with the lift of the balloon body F.

Figure 7A:
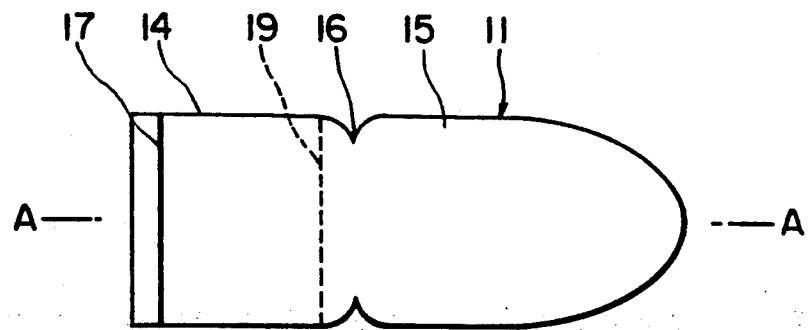
Figure 7B:
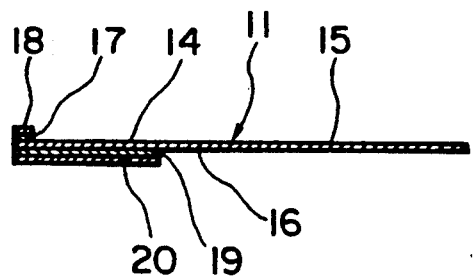
Figure 7C:
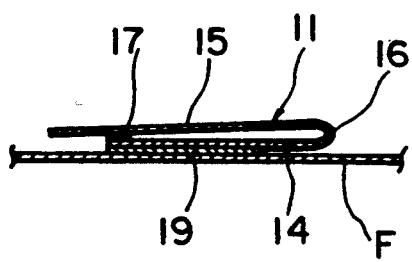
Figure 8:
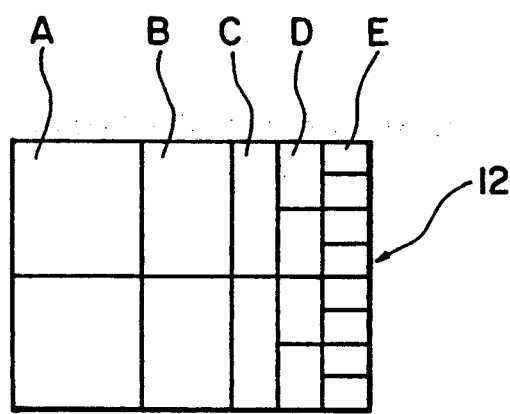
FIG. 8 is a plan view of a magnetic sheet constituting the balancing means.

The balancer cover 11 comprises an adhesive surface portion 14, a covering surface portion 15 and a folding portion 16 for integrally connecting both the adhesive surface portion 14 and the covering surface portion 15. The covering surface portion 15 has a size to cover the entire surface of the adhesive surface portion 14 when folded along the folding portion 16 (as shown in FIGS. 7(A) and 7(C)). An adhesive agent 17 is applied to one end of the adhesive surface 14 so that both ends of the adhesive surface portion 14 and the covering surface portion 15 are adhered. The adhesive agent 17 has a protection sheet 18 at the surface thereof for protecting the surface of the adhesive agent 17. The adhesive agent 17 can be applied to the end portion of the covering surface portion 15. The adhesive surface portion 14 has a rear surface to which an adhesive agent 19 is applied for rendering the adhesive surface portion 14 to adhere to the balloon body F. The adhesive agent 19 has also a protection sheet 20 to protect the surface of the adhesive agent 19. The adhesive agents 17 and 19 can be replaced by both-sided adhesive sheets.

The balancer 12 (FIG. 8) is rectangular and can be divided into various sizes. According to the fourth embodiment, the balancer 12 can be divided into the pieces A, B, C, D and E along perforations or the like demarcating these pieces which are reduced in sizes thereof in this order.

The divided piece A weighs, for example, 1.5 g, B weighs 1.0 g, C weighs 0.5 g, D weighs 0.25 g and E weighs 0.125 g. Applicant's experiment shows that the weight of 0.125 g is important for balancing the lift of the balloon body with the gravity of the balancing means, i.e. regulating the balance of the air floaters having various sizes minutely.

Applicant's experiment further shows that a small balloon body having a capacity of 18 liters is raised or lowered by a slight change of weight of 0.125 g of the balancing means. The divided piece should have the weight of at least 0.125 g. The least weight can be varied depending on the capacity of the balloon body.

If the balloon body has the capacity of 18 liters, it is raised or lowered by the weight of 0.125 g. This is described more in detail.

The balancing means has the following pattern of size and weight.

| 8 | 8 | 8 | 4 | 4 | 2 | 1 |
|---|---|---|---|---|---|---|
|   |   |   |   |   | 2 | 1 |
|   |   |   |   |   |   | 1 |

Where each piece denoted at 1 weighs 0.125 g, 2 weighs 0.25 g which is twice the weight of the pieces denoted at 1, the pieces denoted at 4 weigh 0.5 g which is four times the weight of the pieces denoted at 1, and the pieces denoted at 8 weigh 1 g which is eight times the weight of the pieces denoted at 1. As evident from these pieces of balancing means denoted 1 to 8, they represent multiples of the basic weight of 0.125 g.

This pattern is determined in the floating condition of the air floater.

The relationship between the room temperature and the number of the balancing means is as follows.

| | Room Temperature (°C) | | | | | | |
|---|---|---|---|---|---|---|---|
| | 14 | 16 | 18 | 20 | 22 | 24 | 26 |
| Numbers of pieces to be laid over | ①①④②⑧ | ①①④②⑧ | ①①④①⑧ | ①①④①⑧ | ①①④①⑧ | ①①④⑧ | ①①④⑧ |
| Numbers of pieces to be adhered to the holder | ⑧ | ⑧ | ⑧ | ⑧ | ⑧ | ⑧ | ⑧ |
| Total Weight | 24 | 24 | 23 | 23 | 23 | 22 | 22 |

If the room temperature is about 20° C., the piece denoted at 8 is first adhered at one side thereof to one side of the both-sided adhesive tape. Thereafter, one piece denoted at 8 and one piece denoted at 4 are laid over the first piece denoted at 8. Subsequently, the three pieces denoted at 1 are laid thereover and the air floater is kept quiet for five seconds and monitored. If the balloon body is liable to lower, one piece denoted at 1 is removed while if the balloon body is liable to raise, another piece denoted 1 is added. If an air conditioner is used in the room, there is a temperature difference of about 1° to 2° C. between the floor and the ceiling. Accordingly, the balloon body gradually repeats upward and downward movement relative to the central height of the room. This is caused by the variation of the specific gravity of the air, not by the variation of the helium gas sealed in the balloon body. That is, the balloon body moves upward if the room temperature is lower than the temperature around the balloon body but moves downward if the room temperature is higher than the temperature around the balloon body. Accordingly, the air floater can float inside the room by the regulation of the air conditioner without regulating the balancing means. This is not applied if the air floater is near a window or door communicating with the atmosphere.

At the outdoor or the indoor with which the air is communicating, it is difficult to stay the balloon at the fixed space. Accordingly, the balloon body is moored by a yarn having a diameter of 40 to 60 microns and made of polyester and colored in black so that the air balloon can float for the length of the yarn.

Figure 9:
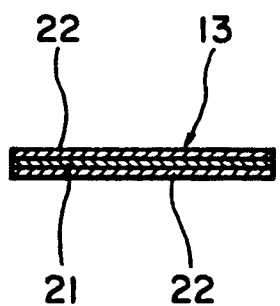
FIG. 9 is a cross-sectional view showing a double-sided adhesive sheet.
Figure 10:
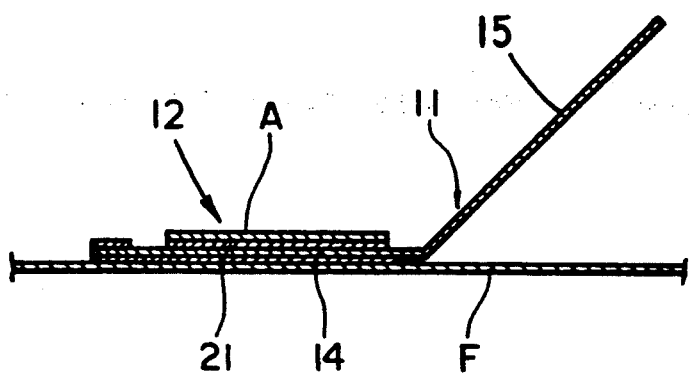
FIG. 10 is a cross-sectional view showing the balancing means having a reference balancer attached to the balancer cover.

The both-sided adhesive sheet 13 is, as illustrated in the cross sectional view of FIG. 9, set as part of the kit and comprises an adhesive agent portion 21 and protection sheets 22 attached to both sides of the adhesive agent portion 21. The both-sided adhesive sheet 13 is, as illustrated in FIG. 9, used by peeling off the protection sheet 22 from the adhesive agent portion 21 and attaching the adhesive agent portion 21 to the adhesive surface portion 14 of the balancer cover 11 (FIG. 10), then attaching the divided piece of the balancer 12, e.g. the divided piece A, to the adhesive agent portion 21 (see FIGS. 8 and 10). The both-sided adhesive agent portion 21 can be replaced by an adhesive agent as applied to the rear surface of the divided piece A.

Figure 11:
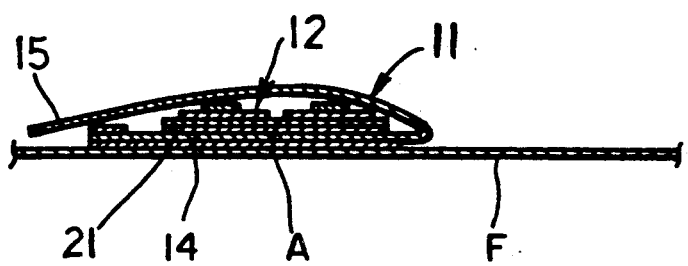
FIG. 11 is a cross-sectional view showing the balancing means attached to the balloon body.

The balancing means having the structure set forth above can be used in the following manner as illustrated in FIG. 11.

First, the adhesive surface portion 14 of the balancer cover 11 is adhered to the balloon body F. The both-sided adhesive agent portion 21 is adhered to the rear surface of a reference arbitrarily selected among the divided pieces of the balancer 12, e.g. the divided piece A (FIG. 8), which is then adhered to the adhesive surface portion 14 (see FIG. 10).

Subsequently, and referring to FIG. 11, at least one additional divided piece of the balancer 12, serving as a regulating balancer, is attracted by the reference balancer, e.g. the divided piece A, so that the lift of the balloon body F and the gravity of the balancing means are balanced.

After the regulation of the balance between the lift of the balloon body F and the gravity of the balancing means is completed, both the reference balancer and the additional regulating balancers are covered by the covering surface portion 15 (see FIG. 11), and the end portion of the covering surface portion 15 is adhered to the end portion of the adhesive surface portion 14 by the adhesive agent portion 17 as in FIG. 7(C).

A modification of the fourth embodiment will be described hereinafter.

It is effective to use a gluing agent instead of the adhesive agent.

The adhesive agent portion 19 provided at the rear surface of the adhesive surface portion 14 of the balancer cover 11 and the adhesive agent portion 17 provided at the surface of the end portion of the adhesive surface portion 14 or at the end portion of the covering surface portion 15 can be replaced by both-sided adhesive sheets which are set as parts of the kit. Instead of the both-sided adhesive sheet 13, the rear surface of the adhesive surface portion 14 of the balancer cover 11 can be adhered by an adhesive agent contained in a container which is part of a kit. The adhesive agent 17 can be replaced by the one contained in the container.

The balancer 12 comprises a plurality of divided balancing sheets having different weights. Furthermore, it is possible to employ papers, synthetic resins sheets and metallic sheets as well as magnetic sheets. In this case, the both-sided adhesive sheet may be adhered to the divided balancer pieces or held between the adhesive surface portion 14 of the balancer cover 11 and the covering surface portion 15 without adhesion.

The balloon body F and the balancing means can be set as a kit.

The air floater according to the fourth embodiment has the advantage that the balancing means to be used in various balloon bodies can be obtained and set to be a kit for wide use. To facilitate the regulation of the balance with ease, a metal film having lines thereon is coated on a magnetic sheet having rubber at one side thereof for assuring precise cutting and enhancing the attraction.

The sizes and the weight of the balancer are varied depending on the size of the balloon body and the card holder, but the experiment showed that the example of the basic pattern can be followed.

Figure 12:
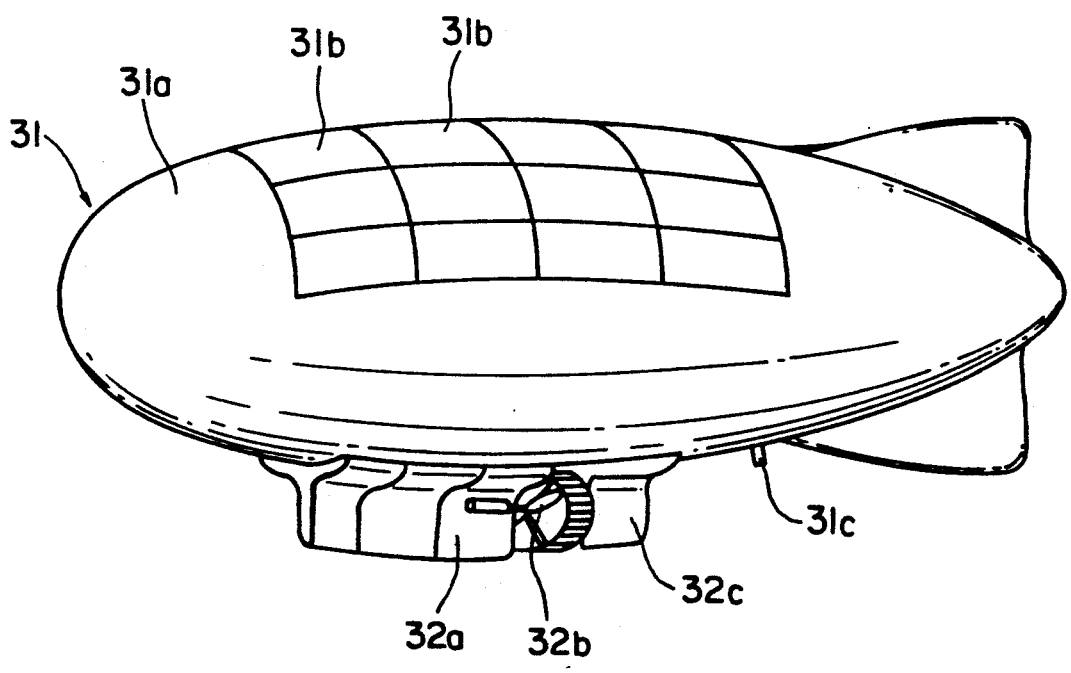
FIG. 12 is a perspective view showing an air floater according to a fifth embodiment of the present invention.

Fifth Embodiment (FIG. 12)

An air floater according to a fifth embodiment of the present invention will be described with reference to FIG. 12.

The air floater is utilized as a miniature airship. The airship comprises an airship body 31 and balancing means. The airship body 31 comprises a film 31a and amorphous sheets functioning as solar cells 31b and attached to the film. Helium gas enters from a gas valve 31c. The balancing means comprises a cockpit 32a having therein a motor which is driven upon reception of electric energy from the solar cells 31b which receive light from the sun or indoor or outdoor illuminators and convert the received light into electric energy, a propeller 32b operated by the motor and a rudder 32c for steering the airship body 31.

Although the invention has been described in its preferred form with a certain degree of particularity, it is to be understood that many variations and changes are possible in the invention without departing from the scope thereof.

What is claimed is:

1. In an air floater comprising a balloon body which seals a gas therein, the gas having a specific gravity less than air, and balancing means detachably attached to the balloon body and having a weight conforming to the lift of the balloon body, the improvement wherein:
   the balloon body comprises a film composed of a central layer made of ethylene-vinyl alcohol copolymer-resin, an aluminum evaporated layer provided outside the central layer, and a heated adhesive layer provided inside the central layer; and
   the balancing means comprises a sublimate sealed in a bag body attached to the balloon body, the sublimate being regulated to sublime gradually corresponding to the amount of decrease of the lift of the balloon body.

2. An air floater according to claim 1, wherein the sublimate comprises a naphthalene.

3. An air floater according to claim 1, wherein the sublimate comprises alcohol.

4. In an air floater comprising a balloon body which seals a gas therein, the gas having a specific gravity less than air, and balancing means detachably attached to the balloon body and having a weight conforming to the lift of the balloon body, the improvement wherein:
   the balloon body comprises a film composed of a central layer made of ethylene-vinyl alcohol copolymer-resin, an aluminum evaporated layer provided outside the central layer, and a heated adhesive layer provided inside the central layer; and
   the balancing means comprises a balancer cover including an adhesive surface portion having a rear surface to be adhered to the balloon body, a cover portion, and a folding portion for integrally connecting both the adhesive surface portion and the cover portion, the balancing means further comprising a balancer composed of one sheet and capable of separating into a reference balancer and a regulating balancer, and a both-sided adhesive sheet for causing the reference balancer to adhere to a front surface of the adhesive surface portion.

5. An air floater according to claim 4, wherein the balancer cover includes a first both-sided adhesive agent provided at the front surface of the adhesive surface portion at one end thereof or at the surface of the cover portion at the other end thereof for adhering the adhesive surface portion to or removing the adhesive surface portion from the cover portion, a first protection sheet for covering a surface of the first adhesive agent, a second both-sided adhesive agent provided at the rear surface of the adhesive surface portion for causing the adhesive surface portion to be adhered to the balloon body, and a second protection sheet for covering a surface of the second adhesive agent.

6. An air floater according to claim 4, wherein the balancer comprises one piece of magnetic sheet.

7. An air floater according to claim 4, wherein the balancer comprises a plurality of detachably connected pieces.

8. An air floater according to claim 4, wherein the balancer comprises a plurality of detachably connected magnetic sheet pieces.

9. An air floater according to claim 5, wherein the first adhesive agent comprises a both-sided adhesive sheet capable of attaching to one end of the adhesive surface portion or one end of the cover portion, the both-sided adhesive sheets being set as a kit.

10. An air floater according to claim 5, wherein the second adhesive agent comprises a both-sided adhesive sheet capable of attaching to the rear surface of the adhesive surface portion, the both-sided adhesive sheets being set as a kit.

11. An air floater according to claim 5, wherein both the first and second adhesive agents comprise respectively adhesive agents contained in a container.

12. In an air floater comprising a balloon body which seals a gas therein, the gas having a specific gravity less than air, and balancing means detachably attached to the balloon body and having a weight conforming to the lift of the balloon body, the improvement wherein:
   the balloon body comprises a film composed of a central layer made of ethylene-vinyl alcohol copolymer-resin, an aluminum evaporated layer provided outside the central layer, and a heated adhesive layer provided inside the central layer; and
   the balancing means comprises a balancer cover including an adhesive surface portion having a rear surface to be adhered to the balloon body, a cover portion, and a folding portion for integrally connecting both the adhesive surface portion and the cover portion, the balancing means further comprising a balancer composed of one sheet and capable of separating into a reference balancer and a regulating balancer, an adhesive agent applied to a rear surface of the reference balancer for causing the reference balancer to adhere to a front surface of the adhesive surface portion, and a protection sheet for covering the adhesive agent.

* * * * *